US008633609B2

(12) United States Patent
Cornelius et al.

(10) Patent No.: US 8,633,609 B2
(45) Date of Patent: Jan. 21, 2014

(54) SUB SEA CENTRAL AXIS TURBINE WITH REARWARDLY RAKED BLADES

(75) Inventors: Tim Cornelius, Singapore (SG); Gary Campbell, Singapore (SG); John Keir, Singapore (SG); Drew Blaxland, Singapore (GB); Peter Pielach, Singapore (SG)

(73) Assignee: Atlantis Resources Corporation PTE Limited, Singapore (SG)

(*) Notice: Subject to any disclaimer, the term of this patent is extended or adjusted under 35 U.S.C. 154(b) by 0 days.

(21) Appl. No.: 12/993,645

(22) PCT Filed: Apr. 14, 2009
(Under 37 CFR 1.47)

(86) PCT No.: PCT/AU2009/000457
§ 371 (c)(1),
(2), (4) Date: Jun. 1, 2011

(87) PCT Pub. No.: WO2009/126995
PCT Pub. Date: Oct. 22, 2009

(65) Prior Publication Data
US 2012/0013129 A1  Jan. 19, 2012

(30) Foreign Application Priority Data
Apr. 14, 2008 (AU) ................. 2008901833

(51) Int. Cl.
F03B 13/00 (2006.01)
(52) U.S. Cl.
USPC .......................................... 290/54

(58) Field of Classification Search
USPC ........................................ 290/43, 54
See application file for complete search history.

(56) References Cited

U.S. PATENT DOCUMENTS

| 1,025,929 | A |   | 5/1912 | Snook |
| 1,371,836 | A |   | 10/1919 | Antz et al. |
| 2,191,341 | A | * | 2/1940 | Curley .......................... 415/207 |
| 2,820,148 | A | * | 1/1958 | Southwick .................... 290/4 D |

(Continued)

FOREIGN PATENT DOCUMENTS

| CA | 2 217 826 | 12/2001 |
| CA | 2 438 041 A1 | 2/2002 |

(Continued)

OTHER PUBLICATIONS

International Search Report for PCT/AU2009/000457, mailed May 12, 2009.

(Continued)

Primary Examiner — Tulsidas C Patel
Assistant Examiner — S. Mikailoff

(57) ABSTRACT

A central axis water turbine is described which comprises a turbine body having a central axis; a rotor mounted on the turbine body for rotation about the central axis, the rotor comprising a central hub supporting a plurality of blades, each blade extending from a blade root mounted on the hub to a blade tip; a generator driven by the rotor; and a housing surrounding the rotor and adapted to direct water flow towards the rotor, the housing converging from a front opening forward of the rotor to a narrower throat adjacent the turbine body; wherein the blades are splayed rearward from the blade root to the blade tip by a tilt angle of 1° to 20° from a plane perpendicular to the central axis.

13 Claims, 15 Drawing Sheets

(56) References Cited

U.S. PATENT DOCUMENTS

| | | | |
|---|---|---|---|
| 3,139,166 A * | 6/1964 | Berlyn | 477/186 |
| 3,464,357 A | 9/1969 | Duport et al. | |
| 3,604,942 A | 9/1971 | Nelson | |
| 3,851,994 A | 12/1974 | Seippel | |
| 3,942,231 A | 3/1976 | Whitaker | |
| 3,986,787 A * | 10/1976 | Mouton et al. | 415/7 |
| 3,986,792 A | 10/1976 | Warner | |
| 4,021,135 A * | 5/1977 | Pedersen et al. | 415/208.2 |
| 4,064,403 A * | 12/1977 | Miller | 290/52 |
| 4,075,500 A * | 2/1978 | Oman et al. | 290/55 |
| 4,078,388 A * | 3/1978 | Atencio | 405/78 |
| 4,207,015 A * | 6/1980 | Atencio | 405/78 |
| 4,256,970 A | 3/1981 | Tomassini | |
| 4,258,271 A * | 3/1981 | Chappell et al. | 290/54 |
| 4,306,157 A | 12/1981 | Wracsaricht | |
| 4,324,985 A * | 4/1982 | Oman | 290/55 |
| 4,352,989 A * | 10/1982 | Gutierrez Atencio | 290/53 |
| 4,524,285 A * | 6/1985 | Rauch | 290/43 |
| 4,531,888 A | 7/1985 | Buchelt | |
| 4,613,279 A | 9/1986 | Corren et al. | |
| 4,722,665 A | 2/1988 | Tyson | |
| 5,440,176 A | 8/1995 | Haining | |
| 5,474,425 A | 12/1995 | Lawlor | |
| 5,506,453 A | 4/1996 | McCombs | |
| 5,575,620 A | 11/1996 | Haller et al. | |
| 5,921,745 A | 7/1999 | Round et al. | |
| 5,929,531 A | 7/1999 | Lagno | |
| 5,954,474 A * | 9/1999 | Fisher et al. | 415/17 |
| 6,013,955 A | 1/2000 | dos Santos Costa | |
| 6,036,443 A | 3/2000 | Gorlov | |
| 6,091,161 A | 7/2000 | Dehlsen et al. | |
| 6,152,684 A | 11/2000 | Ferme et al. | |
| 6,402,477 B1 * | 6/2002 | Cybularz et al. | 416/244 A |
| 6,476,513 B1 | 11/2002 | Gueorguiev | |
| 6,533,536 B1 | 3/2003 | Fisher, Jr. et al. | |
| 6,652,221 B1 | 11/2003 | Praenkel | |
| 6,766,643 B2 | 7/2004 | Christensen | |
| 6,846,160 B2 | 1/2005 | Saito et al. | |
| 6,864,594 B2 | 3/2005 | Seki | |
| 7,083,378 B2 | 8/2006 | Hur | |
| 7,088,012 B2 | 8/2006 | Gizara | |
| 7,095,597 B1 | 8/2006 | Cousineau | |
| 7,199,484 B2 | 4/2007 | Brashears | |
| 7,218,011 B2 * | 5/2007 | Hiel et al. | 290/43 |
| 7,352,074 B1 * | 4/2008 | Pas | 290/43 |
| 7,354,245 B2 * | 4/2008 | Baba | 415/4.1 |
| 7,372,172 B2 * | 5/2008 | Winkler et al. | 290/43 |
| 7,471,009 B2 * | 12/2008 | Davis et al. | 290/54 |
| 7,758,300 B2 * | 7/2010 | Friesth | 415/4.3 |
| 8,206,113 B2 | 6/2012 | Ryynänen et al. | |
| 2002/0192068 A1 | 12/2002 | Seksan | |
| 2002/0197148 A1 | 12/2002 | Belinsky | |
| 2003/0126751 A1 | 7/2003 | Izumi | |
| 2004/0041405 A1 | 3/2004 | Seki | |
| 2004/0070210 A1 | 4/2004 | Johansen et al. | |
| 2004/0191068 A1 | 9/2004 | Richter et al. | |
| 2005/0029817 A1 | 2/2005 | Gizara | |
| 2005/0285407 A1 | 12/2005 | Davis et al. | |
| 2005/0286975 A1 | 12/2005 | Fonfrede et al. | |
| 2007/0007772 A1 * | 1/2007 | Brashears | 290/43 |
| 2007/0071606 A1 | 3/2007 | Borthwick et al. | |
| 2007/0191973 A1 | 8/2007 | Holzbauer et al. | |
| 2007/0231072 A1 | 10/2007 | Jennings et al. | |
| 2007/0231117 A1 * | 10/2007 | Gokhman | 415/2.1 |
| 2007/0231148 A1 | 10/2007 | Lehoczky | |
| 2007/0241566 A1 | 10/2007 | Kuehnle | |
| 2007/0284882 A1 | 12/2007 | Costin | |
| 2008/0056906 A1 | 3/2008 | Gray et al. | |
| 2008/0084068 A1 | 4/2008 | Shibata et al. | |
| 2008/0138206 A1 | 6/2008 | Corren | |
| 2008/0231057 A1 | 9/2008 | Zeuner | |
| 2008/0236159 A1 | 10/2008 | Tierney | |
| 2009/0045631 A1 | 2/2009 | Gibberd et al. | |
| 2009/0076661 A1 | 3/2009 | Pearson et al. | |
| 2009/0123283 A1 | 5/2009 | Corren et al. | |
| 2009/0309365 A1 * | 12/2009 | Sauer et al. | 290/53 |
| 2010/0066089 A1 | 3/2010 | Best et al. | |
| 2010/0117364 A1 | 5/2010 | Harrigan | |
| 2010/0133844 A1 * | 6/2010 | Pearce | 290/54 |
| 2011/0115228 A1 * | 5/2011 | Stothers et al. | 290/52 |
| 2011/0176915 A1 | 7/2011 | Keir et al. | |
| 2011/0210548 A1 | 9/2011 | Sevenster et al. | |
| 2012/0086207 A1 | 4/2012 | Gray | |
| 2012/0133140 A1 | 5/2012 | Cornelius et al. | |
| 2012/0169057 A1 | 7/2012 | Tonkin | |
| 2012/0191265 A1 | 7/2012 | Keir | |
| 2012/0200084 A1 | 8/2012 | Blaxland et al. | |
| 2012/0202369 A1 | 8/2012 | Blaxland | |
| 2012/0267895 A1 | 10/2012 | Blaxland | |
| 2012/0280507 A1 | 11/2012 | Keir | |

FOREIGN PATENT DOCUMENTS

| | | |
|---|---|---|
| CN | 2528952 | 1/2003 |
| DE | 102 27 404 A1 | 1/2004 |
| EP | 0 020 207 A1 | 12/1980 |
| EP | 0 223 731 A1 | 5/1987 |
| EP | 1878914 A2 | 9/2007 |
| EP | 1988282 A2 | 11/2008 |
| GB | 1 518 151 | 7/1978 |
| GB | 2 426 295 | 11/2006 |
| GB | 2 437 533 | 10/2007 |
| GB | 2 448 710 | 3/2009 |
| JP | 2002-256810 | 9/2002 |
| KR | 2004107166 | 12/2004 |
| WO | WO 01/14739 A1 | 1/2001 |
| WO | WO 01/48374 A2 | 7/2001 |
| WO | WO 2005/010353 A2 | 2/2005 |
| WO | WO 2005/045243 A1 | 5/2005 |
| WO | WO 2005/061173 | 7/2005 |
| WO | WO 2006/052923 A1 | 5/2006 |
| WO | WO 2007/125349 A2 | 11/2007 |
| WO | WO 2008/100157 A1 | 8/2008 |
| WO | WO 2010/125476 A1 | 11/2010 |

OTHER PUBLICATIONS

Written Opinion for PCT/AU2009/000457, mailed May 6, 2009.
International Preliminary Report on Patentability for PCT/AU2009/000457, mailed Apr. 19, 2010.
Swenson, W. J., "The Evaluation of an Axial Flow, Lift Type Turbine for Harnessing the Kinetic Energy in a Tidal Flow," Northern Territory Centre for Energy Research, Northern Territory University, Darwin, Australia, Sep. 1999.
Sharkh, SM Abu, et al., "Performance of an Integrated Water Turbine PM Generator," Proceedings of the 14th Interntional Symposium on Power Semiconductor Devices & ICS, pp. 486-491, Apr. 2002.
Schönborn, et al., "Development of a Hydraulic Control Mechanism for Cyclic Pitch Marine Current Turbines," Renewable Energy, Pergamon Press, Oxford, GB, vol. 32, No. 4, pp. 662-679, Apr. 2006.
International Search Report for International Application No. PCT/AU2009/000458, mailed May 25, 2009.
Written Opinion for International Application No. PCT/AU2009/000458, mailed May 25, 2009.
International Preliminary Report on Patentability for International Application No. PCT/AU2009/000458, mailed Jul. 12, 2010.
International Search Report and Written Opinion for International Application No. PCT/IB2010/001364, mailed Oct. 7, 2010.
International Search Report and Written Opinion for International Application No. PCT/IB2010/001346, mailed Aug. 26, 2010.
Office Action for Chinese Patent Application No. 200880117406.0, mailed Apr. 28, 2012.
Supplemental European Search Report for EP 10769392.1, mailed Feb. 18, 2013.
Supplemental European Search Report for EP 10769393.9, mailed Feb. 28, 2013.

(56) References Cited

OTHER PUBLICATIONS

Supplemental European Search Report for EP 09732944.5, mailed Feb. 19, 2013.
English Translation of Office Action for Korean Patent Application No. 10-2010-7025661, mailed Jul. 19, 2012.
Office Action for Canadian Patent Application No. 2,724,702, mailed Sep. 24, 2012.
Supplemental European Search Report for EP 09 73 2862, mailed Sep. 2, 2011.
Office Action for U.S. Appl. No. 13/394,673, mailed Sep. 9, 2013.

* cited by examiner

SUB SEA CENTRAL AXIS TURBINE WITH REARWARDLY RAKED BLADES

CROSS-REFERENCE TO RELATED APPLICATIONS

This application is a U.S. National Stage Entry and claims priority under 35 U.S.C. 371 of International Patent Application No. PCT/AU2009/000457, filed Apr. 14, 2009, which claims priority to Australia Application No. 2008901833, filed Apr. 14, 2008. The International Patent Application No. PCT/AU2009/000457 and the Australia Application No. 2008901833 are hereby incorporated by reference in their entirety.

FIELD OF INVENTION

The present invention relates to central axis turbines for generating usable energy from water flow.

BACKGROUND

Central axis water turbines harness power from water currents by using the flow of water to energise the turbines and generate other usable forms of power. The design of central axis water turbines has been influenced by the design of wind turbines which use the flow of air to energise the turbine. The blades of turbines are traditionally straight blades that extend radially outwards, perpendicular to the central axis of the turbine.

While both wind and water turbines generate power from the flow of fluid over the turbine blades, there are significant differences between the characteristics of water flow and air flow through turbines and over the blades.

For these and other reasons, known central axis water turbines do not provide optimum usable power output in typical water flow conditions.

The present invention seeks to ameliorate one or more of the abovementioned disadvantages.

SUMMARY OF INVENTION

In accordance with a first aspect of the present invention, there is provided a central axis water turbine including:
a turbine body having a central axis;
a rotor mounted on the turbine body for rotation about the central axis, the rotor comprising a central hub supporting a plurality of blades, each blade extending from a blade root mounted on the hub to a blade tip;
a generator driven by the rotor; and
a housing surrounding the rotor and adapted to direct water flow towards the blades;
wherein the blades are splayed rearward from the blade root to the blade tip by a tilt angle of about 1° to 20° from a plane perpendicular to the central axis.

Preferably, the housing converges from a front opening forward of the rotor to a narrower throat adjacent the turbine body.

Preferably the blades are splayed rearward from the blade root to the blade tip by a tilt angle of 2° to 10°, and more preferably by 4° to 6° from the plane perpendicular to the central axis. Further preferably, the blades are splayed rearward from the blade root to the blade tip by a tilt angle of about 5° from the plane perpendicular to the central axis.

The rotor preferably includes a nose cone mounted on the front of the rotor to reduce drag on the rotor and reduce turbulent water flow through the housing.

Preferably the nose cone is hollow to provide space for auxiliary systems such as control system or reservoirs for auxiliary or even primary systems.

In a preferred embodiment, the generator is housed with the rotor, the generator being adapted to generate electrical power from the rotation of the rotor. Preferably the generator is directly connected to a shaft. Preferably the generator is connected to the shaft by a splined connection.

Preferably, the generator is driven directly by the rotor, and this arrangement may suit the input speed required by selected generators such as multi-pole or high-pole electric generators. However, in some arrangements it may be suitable to connect a gearbox to the shaft or generator so that the rotation speed of shaft input to the generator is converted to a rotation speed that suits other types of generator.

The blades can be of any cross-sectional shape such as an aerofoil, or tapered or trapezoidal, rectangular, parallel, curved or twisted. In preferred arrangements the aerofoil shape is a NACA 4412 series cross-sectional shape.

Further, it will be appreciated that any blade shape is suitable and that a downstream or rearward tilt or rake angle of 1° to 20° can improve the power output of a central axis turbine having a suitable housing compared with the same turbine with a rake angle of 0° (i.e. with no rake or tilt).

Preferably support struts are provided to support the rotor and generator. Preferably the support struts are hollow to provide ducts or reservoirs. In one arrangement the support struts extend substantially radially between the rotor and generator. In preferred embodiments, a generator end of the support strut is mounted so that the support strut extends substantially tangentially to the generator. This is to improve torque transfer between the generator and the housing, facilitating lighter support struts. Furthermore, an advantage of this preferred arrangement is that fatigue loads on the support struts are reduced since the tangentially-mounted support struts are never disposed completely behind, or completely "shadowed" by the radially-mounted blades when in use.

Preferably a brake is provided, in use to inhibit rotation of the rotor. Preferably the brake is a fail-safe mechanism. Preferably in use a braking actuator holds a brake element remote from the rotor against an actuation force when power is applied to the brake element. In use, when power is removed from the braking actuator, the actuation force, which may be from a spring or utilising some appropriate other kind of urging force, overcomes the braking actuator's force and applies the braking element to the rotor, slowing or stopping the rotation of the rotor.

Preferably a boot or a plug is provided at the blade root to cover any gaps or bumps or bolt heads and the like to minimise interference drag in that region.

Preferably, the housing defines a flow channel having a flow restriction. Advantageously, this arrangement increases the velocity of liquid flowing through the flow channel in a restricted part of the flow channel, relative to an unrestricted part of the flow channel. The flow restriction preferably comprises a venturi, which may form part or the entire flow channel. In particular, the venturi may comprise a divergent-convergent-divergent venturi, tapering from openings at either end of the flow channel towards an inner part of the flow channel.

Preferably the housing is substantially symmetrical about the rotor.

The venturi may comprise at least one first frusto-conical, frusto-pyramid or horn shaped body, optionally a cylindrical body, and an at least one second frusto-conical, frusto-pyramid or horn shaped body.

In one arrangement a gap may be provided between a divergent end of one first/second frusto-conical, frusto-pyramid or horn shaped body and an adjacent convergent end of one further first/second frusto-conical, frusto-pyramid or horn shaped body, the divergent end of the one first/second frusto-conical, frusto-pyramid or horn shaped body being smaller in diameter than the convergent end of the one further first/second frusto-conical, frusto-pyramid or horn shaped body.

Preferably the divergent end of the one first/second frusto-conical, frusto-pyramid or horn shaped body is substantially longitudinally coincident with the convergent end of the one further first/second frusto-conical, frusto-pyramid or horn shaped body.

In a preferred embodiment, the housing extends rearward of the rotor and acts as a diffuser, the housing diverging from the throat to a rear opening rearward of the rotor.

Preferably, the rotor supports at least two blades. Further preferably, the turbine has either 3 or 6 blades. It will be appreciated, however, that any number of blades of 2, 3, 4, 5, 6 or more can be used with the turbine.

Preferred embodiments of the present invention include raked or rearwardly-splayed blades, from the base to the blade tip by a tilt angle of about 1° to 20° from a plane perpendicular to the central axis to facilitate improved usable power generation from the turbine.

According to a second as aspect of the present invention there is provided a method of generating power from water flow, the method comprising:

providing a central axis water turbine according to the first aspect of the present invention to a marine or river environment;

allowing water movement through the turbine to cause the blades to rotate; and drawing usable power from the turbine.

According to a third aspect of the present invention there is provided a central axis water turbine comprising:

a turbine body having a central axis;

a rotor mounted on the turbine body for rotation about the central axis, the rotor comprising a central hub supporting a plurality of blades, each blade extending from a blade root mounted on the hub to a blade tip;

a generator driven by the rotor; and a housing surrounding the rotor and including one or more inner walls being spaced from the rotor so as to be disposed adjacent the plurality of blade tips at least at selected times when in use.

According to a fourth aspect of the present invention there is provided a kit of parts for a central axis water turbine, the kit including: a power generator module comprising a central axis and a turbine body, a rotor mounted on the turbine body for rotation about the central axis, the rotor comprising a central hub for supporting a plurality of blades, the power generator module further including mounts for mounting one or more support struts and a generator in use driven by the rotor; a plurality of blades; a housing; a plurality of support struts for supporting the power generator module in a central position relative to the housing; wherein the housing, when in use surrounds the rotor and includes one or more inner walls being spaced from the rotor so as to be disposed adjacent the plurality of blade tips at least at selected times when in use, wherein the housing further includes support strut mounts for mounting support struts so that to install on site, the support struts may be readily assembled to extend between the power generator module and the housing.

Preferably the housing is in the form of a main body comprising a cylindrical bore within which the rotor and blades are disposed.

Preferably the blades are splayed rearward from the blade root to the blade tip by a tilt angle of about 1° to 20° from a plane perpendicular to the central axis.

Turbines according to preferred embodiments of the present invention are suitable for use in flowing bodies of water such as found in the sea and in rivers. Sea currents and tidal flows can be harnessed by the present invention to generate electricity.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia before the priority date of each claim of this specification.

In order that the present invention may be more clearly understood, preferred embodiments will be described with reference to the following drawings and examples.

DETAILED DESCRIPTION OF PREFERRED EMBODIMENTS

Figure 1:
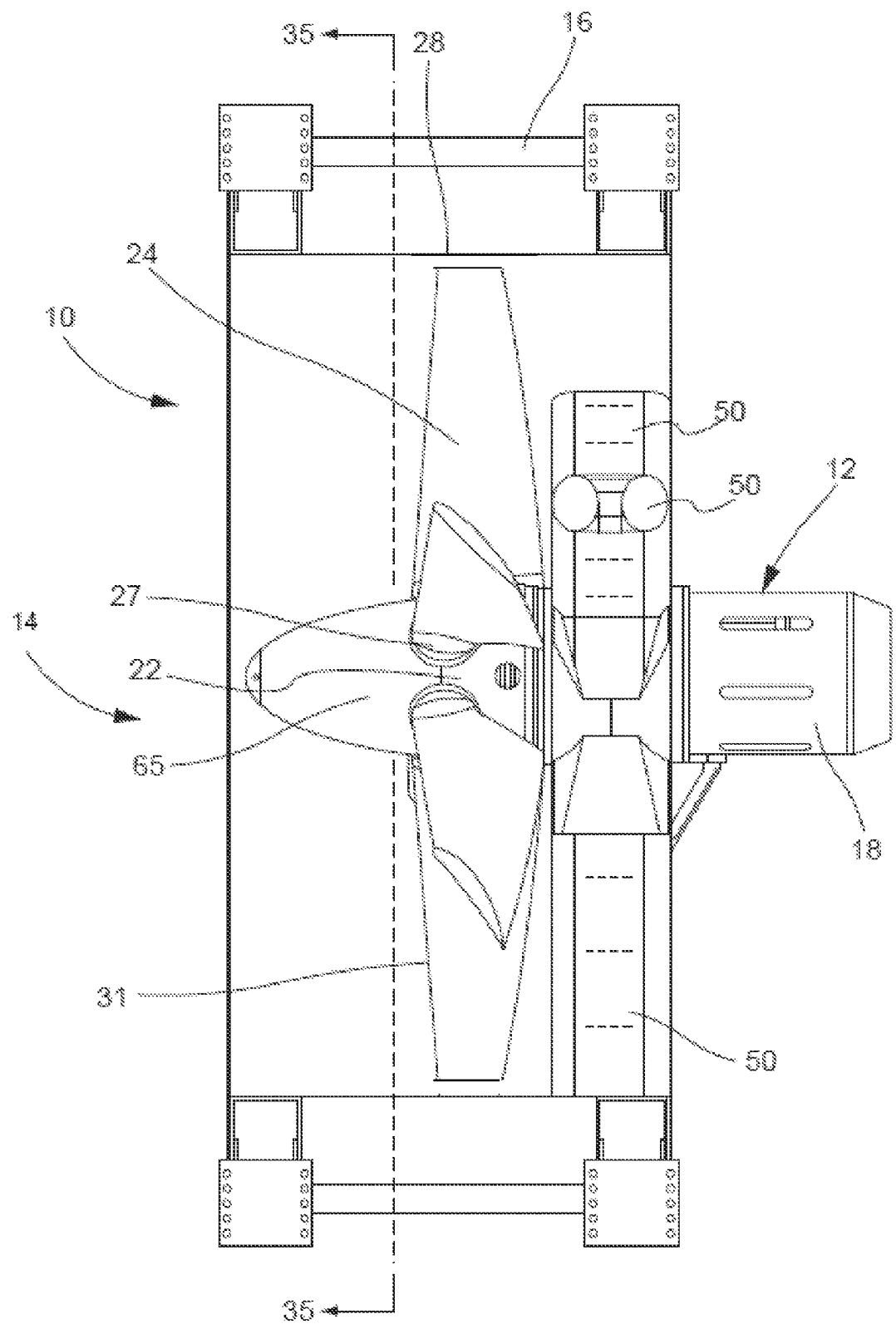
FIG. 1 depicts a side elevation section view (taken along line 1-1 of FIG. 7) of a central axis water turbine according to a preferred embodiment of the present invention.

Seawater is approximately 832 times more dense than air; therefore the kinetic energy available from a five knot ocean current is approximately equivalent to a wind velocity of 270 km/h. Water moving at five knots through an area bounded by a 150 m diameter circle represents roughly 100,000 kW of power. Also, unlike wind, tidal flow or river flow is predictable—enhancing load scheduling/planning activities.

Tidal technology is less intrusive than onshore wind installations or offshore tidal barrages; thus advantageously with preferred embodiments of the present invention, any hazard to navigation or shipping would be no more than that experienced when adjacent known offshore installations.

Referring to the Figures, a central axis water turbine assembly in accordance with a preferred embodiment of the present invention is generally indicated at 10 and comprises a main body 12, a rotor 14 and an optional housing or cowling 16. The main body 12 includes an electric generator assembly 18 and the rotor 14 is mounted for rotation on a shaft 20 about a central axis. The rotor 14 includes a hub 22 supporting a plurality of blades 24, the present preferred embodiment shown with six blades, each blade extending from a blade root 27 mounted on the hub to a blade tip 28. When installed, the housing 16 is disposed in a position so that an inner wall encircles the rotor 14. In some embodiments a converging section 129 of the housing 16 directs water flow from a front opening 29 forward of the rotor to a narrower throat 30 adjacent the rotor 14 towards the blades 24. The blades 24 of the rotor 14 are raked rearwardly from the blade root 27 to the blade tip 28 by a tilt angle of approximately 5°, meaning that the leading edge 31 extends rearwardly from the blade root 27 to the blade tip 28 at an angle of approximately 5° to a plane 35 perpendicular to the central axis passing through the leading edge at the blade root 27.

Any suitable feature may facilitate the 5° repose of the blade downstream or rearward. However, in the drawings, it can be seen that the rotor 14 includes a hub which supports up to six blades. Each hub includes a bore which can be accessed by removing a front cylinder half. The bore is tilted rearwardly by 5°. The blade includes a stem which extends parallel to the leading edge of the blade. Thus, the leading edge of the blade is raked rearwardly or downstream by 5°.

Figure 2:
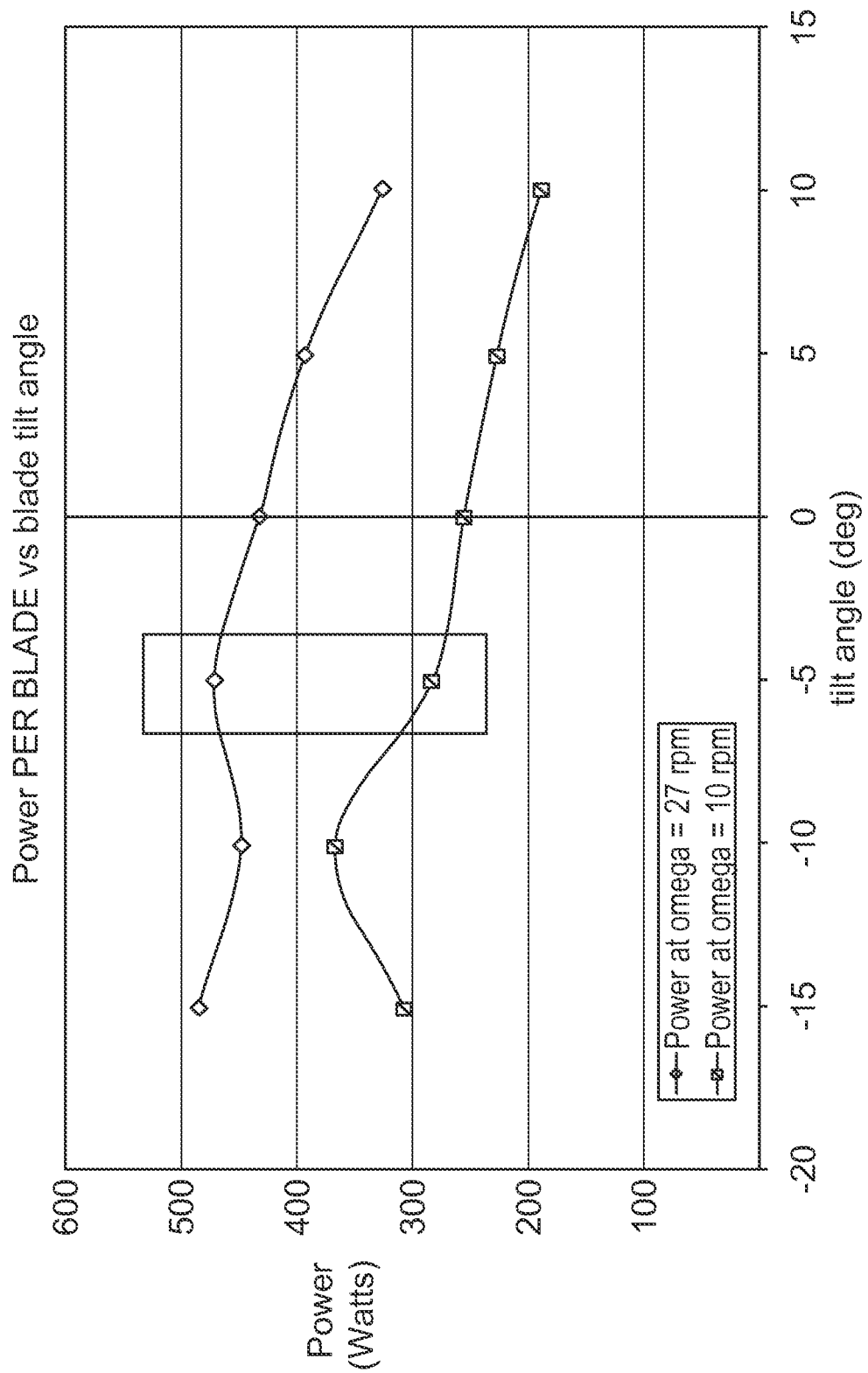
FIG. 2 is a graphical display of power output of the turbine plotted against various rake or tilt angles at different flow conditions.

Preferred tilt angles were determined using computational fluid dynamics (CFD) modelling. The graph depicted in FIG. 2 shows the modelled relative power output of a turbine for various tilt angles at different flow conditions. The optimum points are when the efficiencies are at the highest for each speed. This specifies that for the turbine to run at optimum efficiency under known conditions and design criteria, the blade should have a rearward tilt angle of between 1° and 20°, preferably about 5°. While the graph indicates that optimum efficiency may be achieved with tilt angles of greater than 5°, a tilt angle of no more than about 5° is preferable to minimise bending moments at the blade root under some mechanical configurations. However, with appropriate mountings, it is envisaged that tilt angles greater than 5°, say, up to 20° or more may be employed successfully.

In use, on some embodiments, when deployed in a current and generally parallel with it, water is directed by the converging cowling or housing 16 to flow toward the rotor 14. As the water flows past the blades 24, the rotor 14 is driven to rotate the shaft 20 about the central axis, which in turn drives the generator 18 producing electrical power output. The generator assembly 18 may be connected to a gearbox which in turn would be connected to the shaft, but in this preferred embodiment, the generator 18 is directly coupled to the shaft with a splined connection without requiring a gearbox.

The shaft 20 may be of any suitable material so as to resist corrosion in an aggressive environment and to support the loadings required. Carbon steel is preferred, however, other materials may be useful, including for example, stainless steel. Furthermore, for the same protective purpose, some exposed parts of the shaft are covered with a sleeve or sheath or other prophylactic material such as for example paint. Grease or other protective material such as for example barium dichromate or the like is packed or injected into the interstitial space between the sleeve and the shaft in order to facilitate further protection of the shaft.

Figure 15:
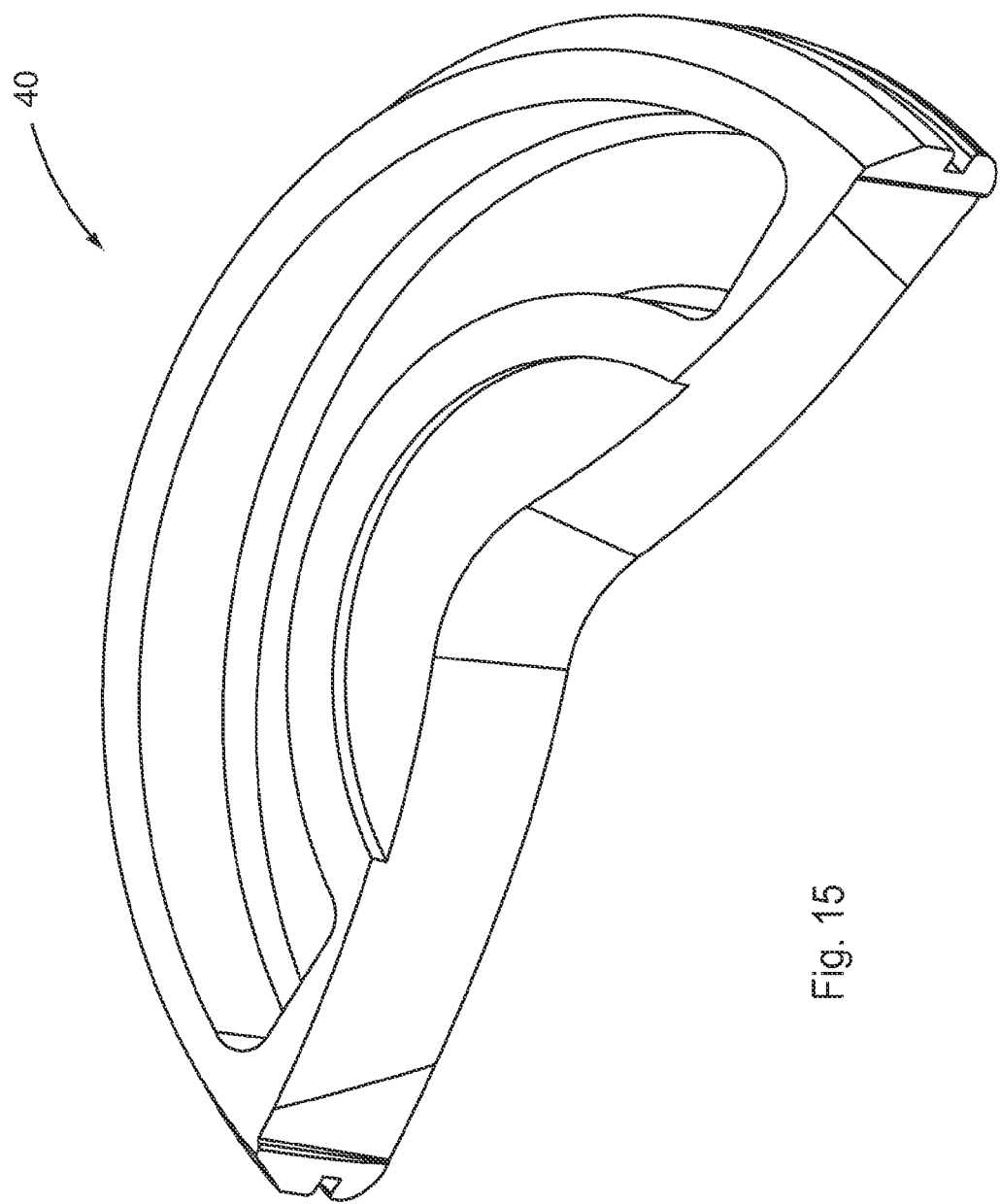
FIG. 15 is an isometric view of a half-boot or half-plug for reducing interference drag at a blade/nose cone interface.

In order to minimise interference drag, a plug 40 is provided around and/or adjacent the blade root 27 so as to smooth the flow of water in the region adjacent the blade root 27 and hub. The plug 40 may be constructed from polyurethane and may be in the form of a flexible boot or a sealant/adhesive fluid which to install is pumped into place. The preferred plug 40 is shown, or one half of it, at FIG. 15.

The hub 22 is affixed to the shaft with an interference fit so as to simplify its connection to the shaft but also to maintain security of that connection.

Figure 3:
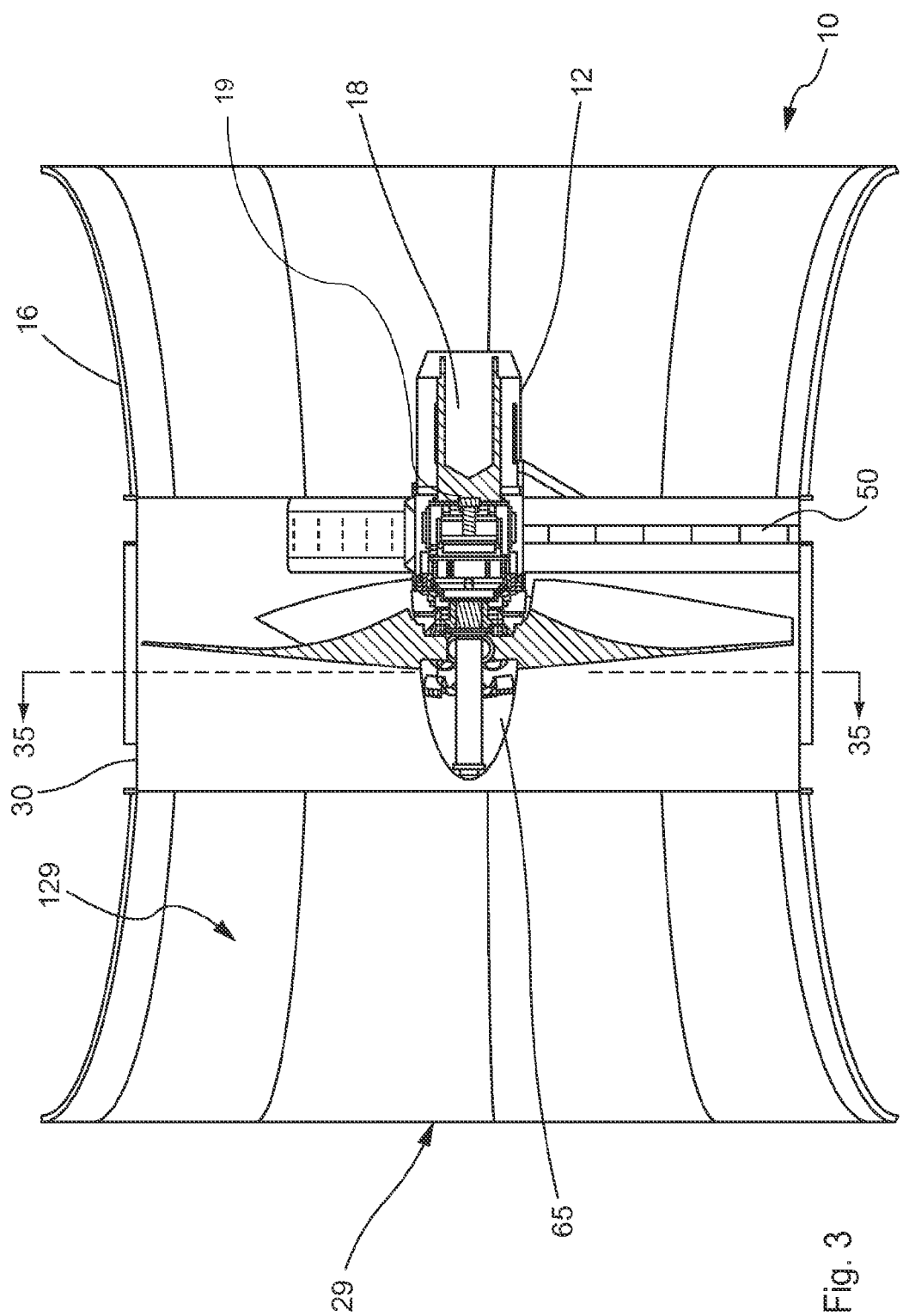
FIG. 3 is a side elevation section view of a central axis water turbine according to another preferred embodiment of the present invention.
Figure 5:
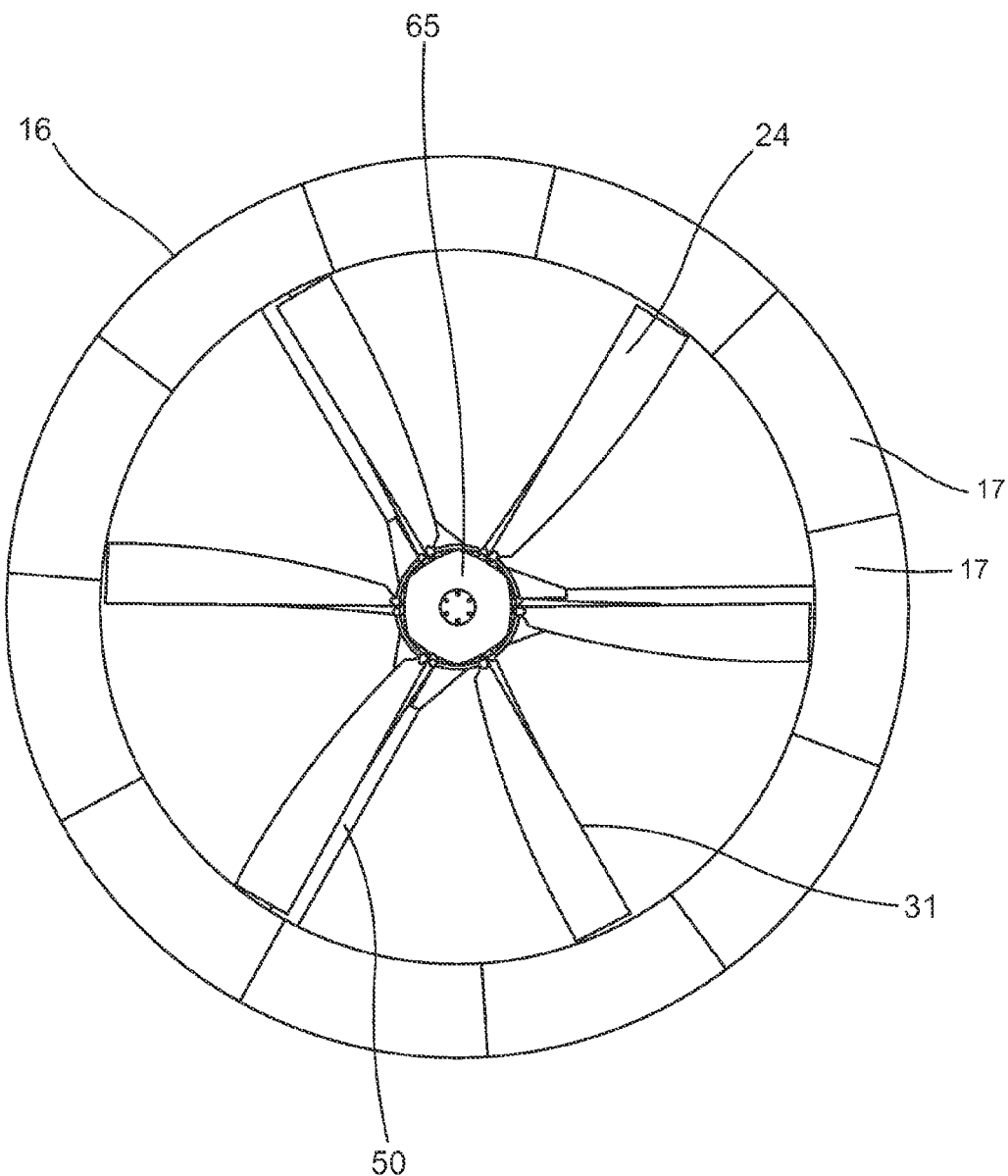
FIG. 5 a front elevation view of the central axis water turbine according to a preferred embodiment of the present invention.
Figure 6:
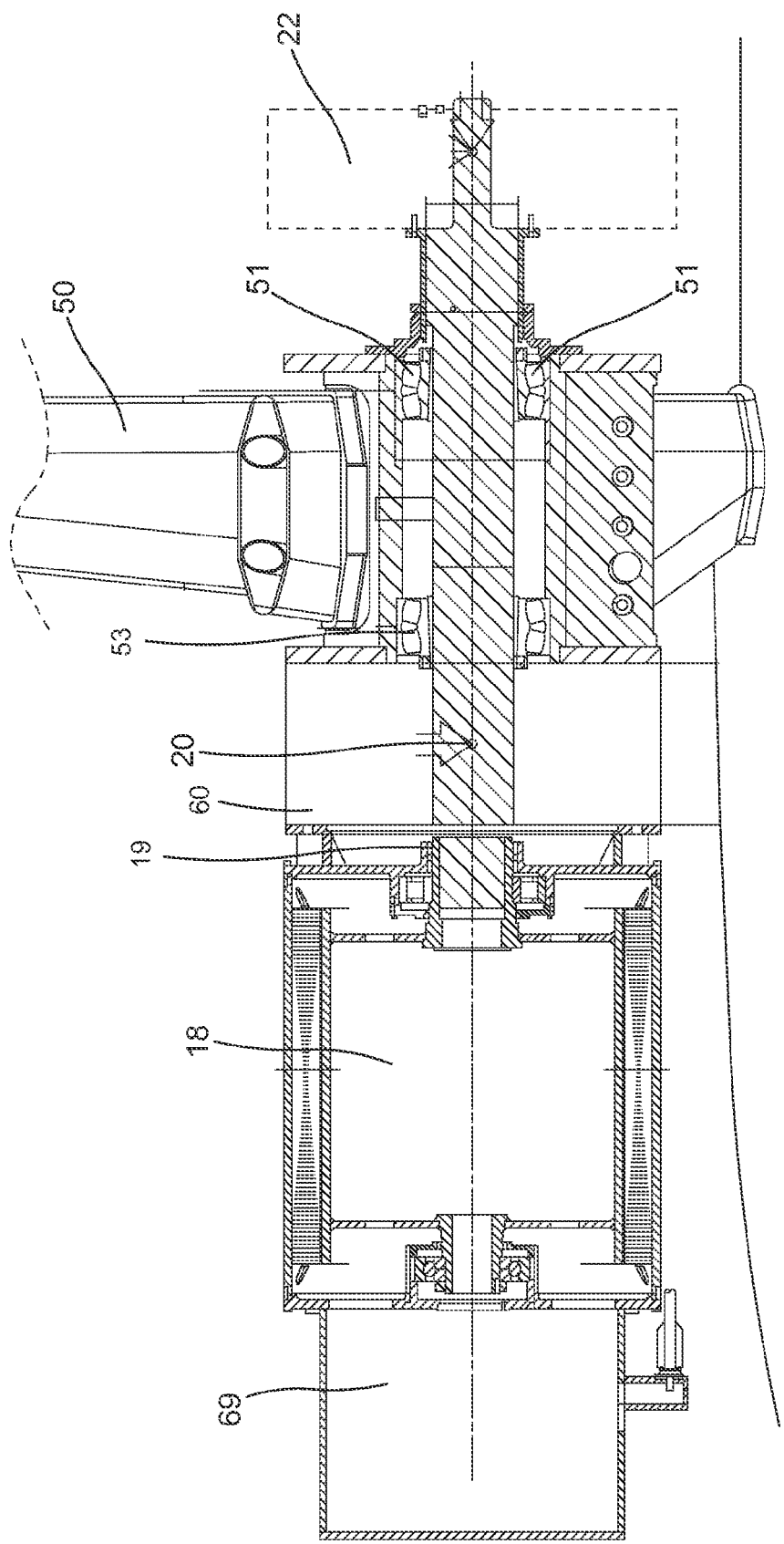
FIG. 6 is a section view in side elevation of a central axis water turbine according to yet another embodiment of the present invention.
Figure 7:
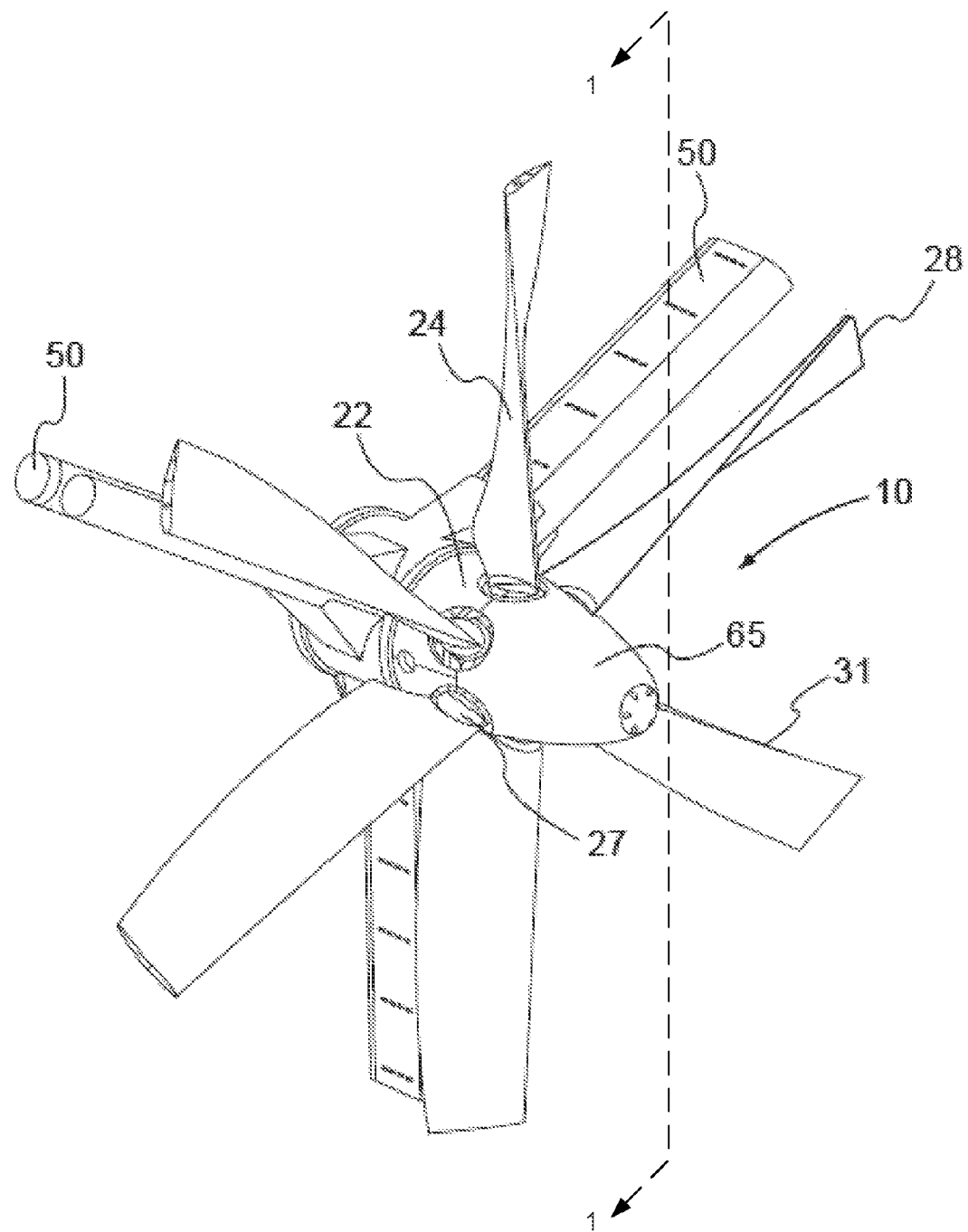
FIG. 7 is an isometric view of the central axis water turbine according to an embodiment of the present invention with the housing or cowling removed for clarity.
Figure 9:
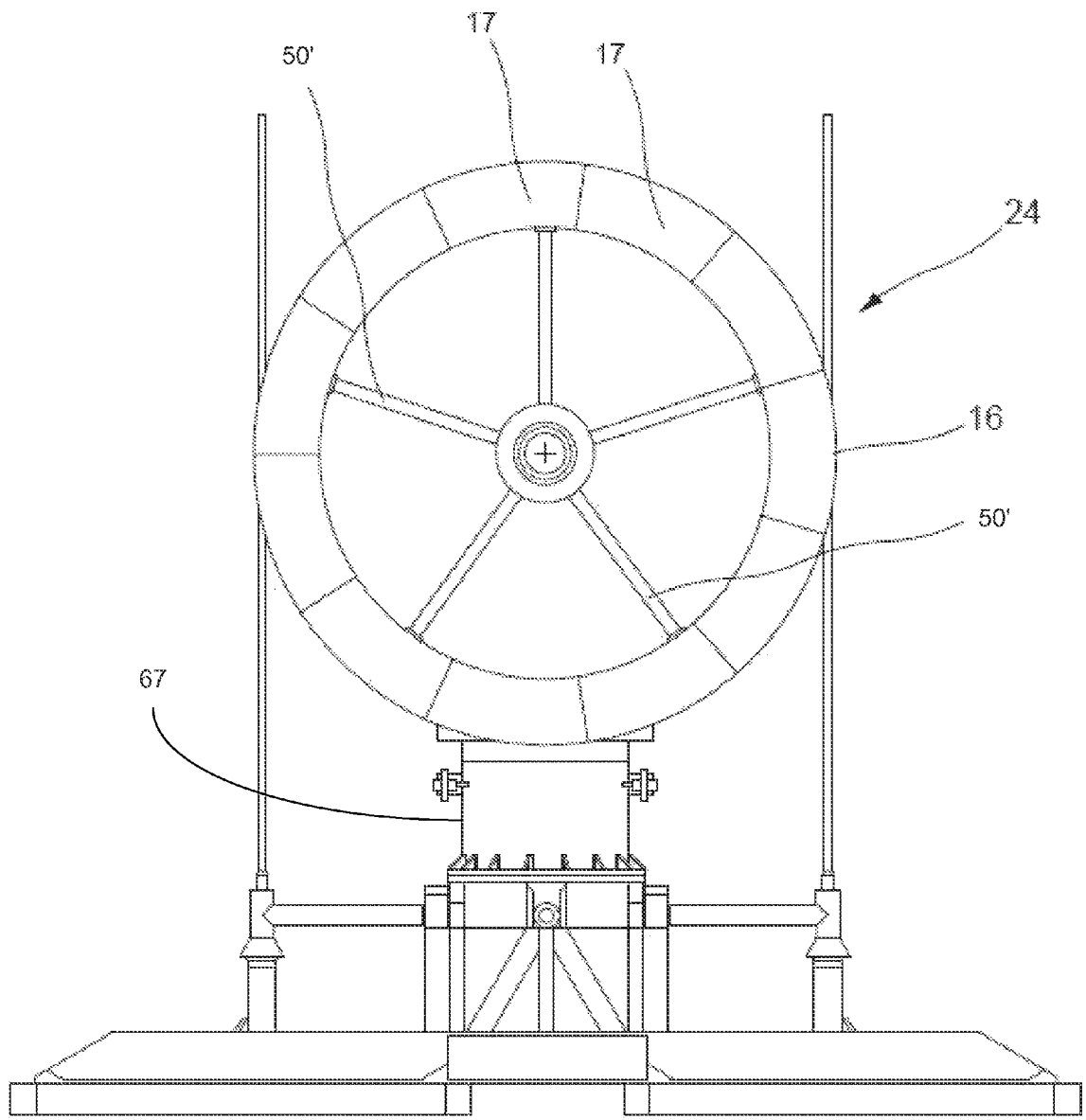
FIG. 9 is a front elevation view of the installed turbine shown in FIG. 8.
Figure 10:
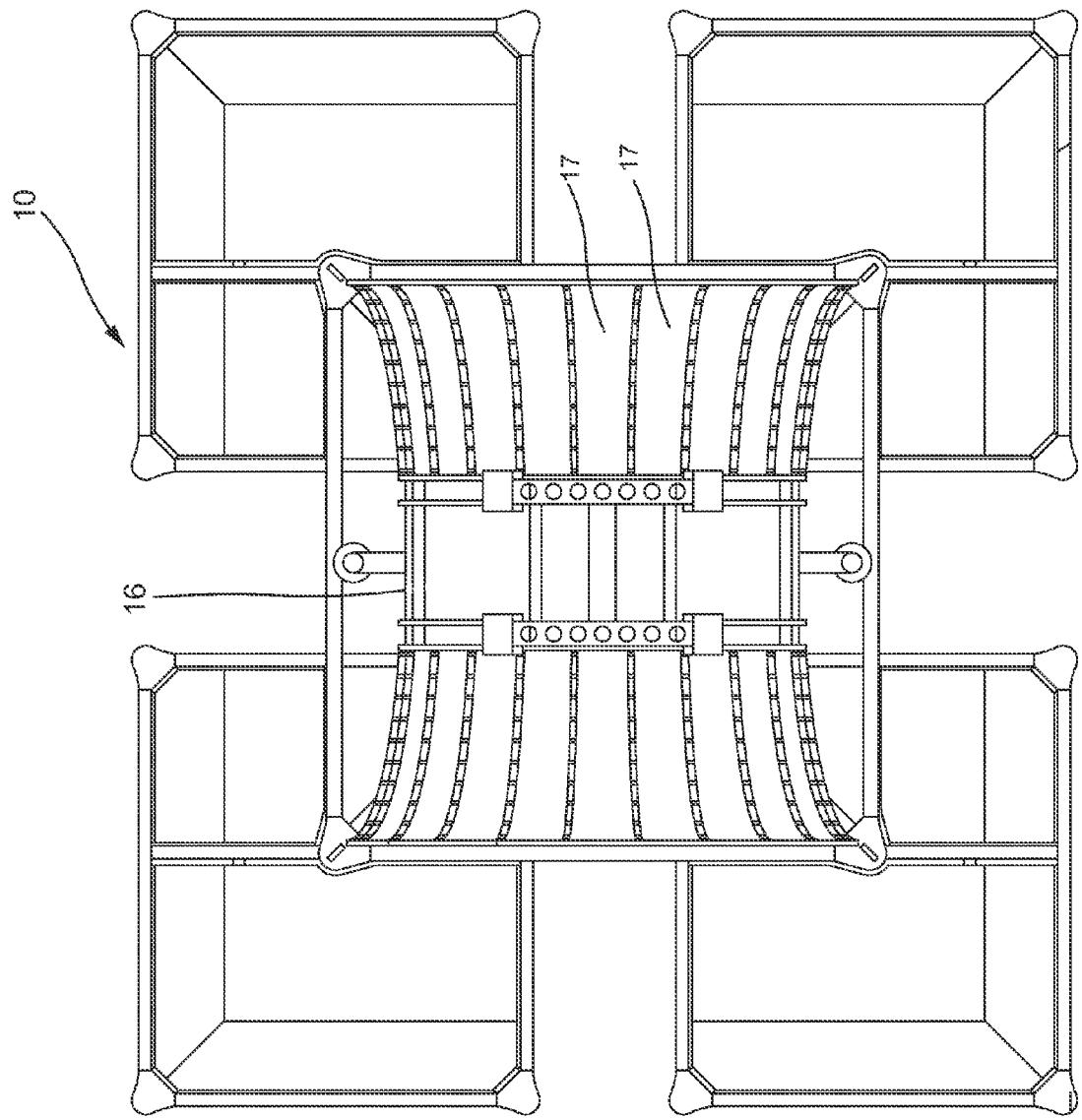
FIG. 10 is a plan view of the installed turbine shown in FIG. 8.
Figure 11:
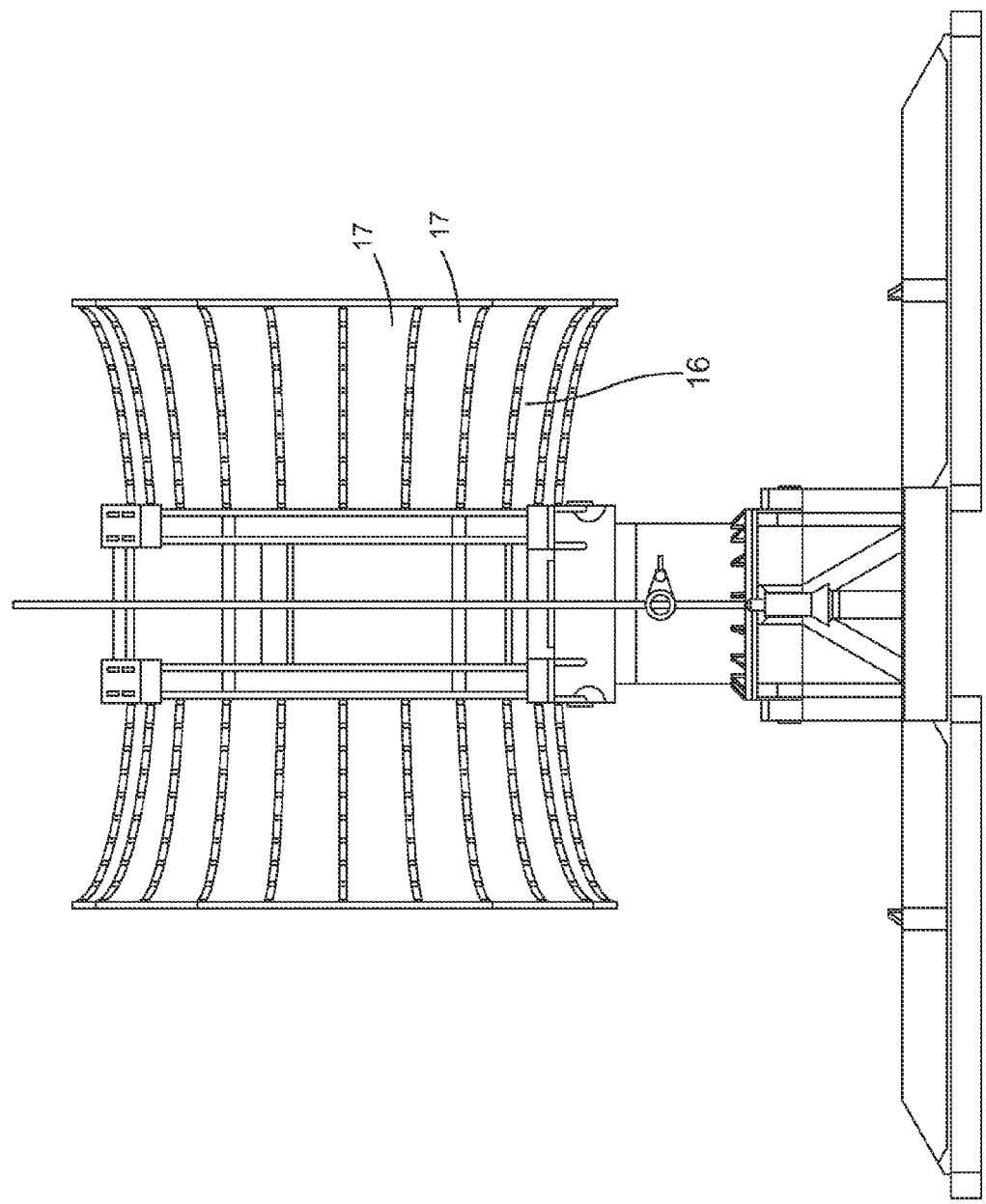
FIG. 11 is a side elevation view of the installed turbine shown in FIG. 8.

Support struts 50, 50' are connected to the cowling or housing 16 so as to support the main body 12 and rotor in a substantially central disposition in the cowling and/or housing 16. Any suitable number of support struts 50, 50' may be used. FIGS. 1, 3, and 7 depict three struts 50. FIG. 9 depicts five struts 50'. The support struts 50, 50' may be hollow so as to house reservoirs of material such as for example grease, air or hydraulic fluid, or to form ducts for the passage of electrical cables or hydraulic oil lines and the like. The support struts 50 shown in FIGS. 1 and 5, respectively, for example, radially extend from the generator and rotor.

Furthermore, the support struts 50 rotatably support the shaft 20. Two spaced-apart bearings are used, one upstream 51 and one downstream 53, interconnected by a bearing sleeve. The support struts 50 connect to the bearing sleeve at their outer diameter.

A brake 60 is provided, which in the preferred embodiment shown, is disposed adjacent the support struts. The brake 60 is preferably a fail safe mechanism, wherein pressure, preferably hydraulic, is used when the turbine 10 is in use to hold a brake shoe or a resistance element such as for example a magnetic or pneumatic element, against an engagement force, out of engagement with the shaft 20. If there is a failure condition such as a blade loss, breakage, or electricity cut, or some other problem, the power to the brake is cut, either slowly or quickly, so that the engagement force drives the brake shoe or braking element into engagement or activation with the shaft 20 to slow or stop the shaft 20 and rotor 14.

Figure 4:
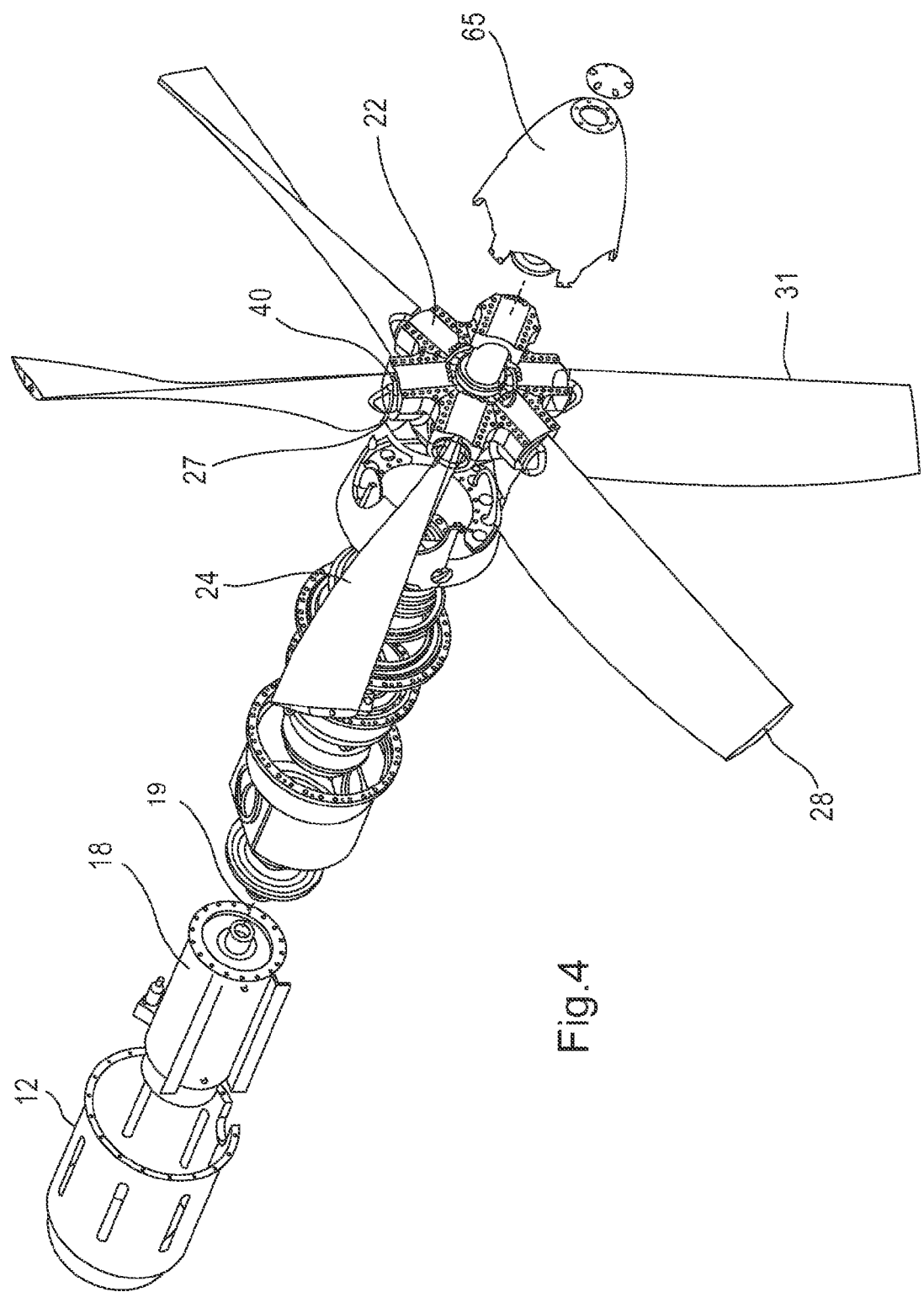
FIG. 4 shows an isometric exploded view of a rotor of a water turbine according to a preferred embodiment of the present invention.

FIG. 4 is an exploded view of a preferred turbine main body 12 and rotor 14. The main body 12 houses the generator 18 which is directly connected to the shaft 20 via a splined connection 19. The generator 18 which in the embodiment shown is an induction motor or permanent magnet motor, which, in generator mode, is used to convert the mechanical power output from the rotation of the rotor to electrical power. Mechanical torque is supplied by the rotating blades 24 to the shaft 20, which induces a voltage at the stator output terminals. Conventionally, induction motors have a variable rotor flux, provided from an external source. This flux interacts with the stator flux and the difference between the rotational frequencies of the two determines the mechanical torque or induced terminal voltage when operating as a motor or generator respectively.

Six blades 24 are mounted on the hub 22 of the rotor 14 and may be blades 24 having a twist angle in the order of 70° as depicted here. However, blades 24 of many different shapes and configurations can be used for the turbine 10, without departing from the spirit or ambit of the invention. The blades 24 can be manufactured from a mould process using fibre reinforced plastics or other compounds such as carbon fibre reinforced plastics, but can alternatively be fabricated using structural ribs and sheet skin from steel, non-ferrous alloys or fibre reinforced plastics. Fibre direction at the root 27 is longitudinal as shown in the Figures, in order to improve strength at that critical point.

A nose cone 65 is mounted on the front of the hub 12 of the rotor 14 to reduce drag on the rotor 14 and to promote flow attachment. The nose cone 65 can be fabricated from a variety of materials, including but not limited to fibre reinforced plastics, other composites or steel. The nose cone may be solid, but in the preferred embodiment shown, is hollow and may provide space for reservoirs such as for example grease tanks. A tail cone may also be provided and may have the same functionality as the nose cone, in the preferred embodiment, being as shown in the drawings. Preferably, a grease tank and dosing unit are provided, disposed on an upper portion of the housing, outside the throat and blades so as not to interfere with the water flow from which usable energy is extracted.

Figure 12:
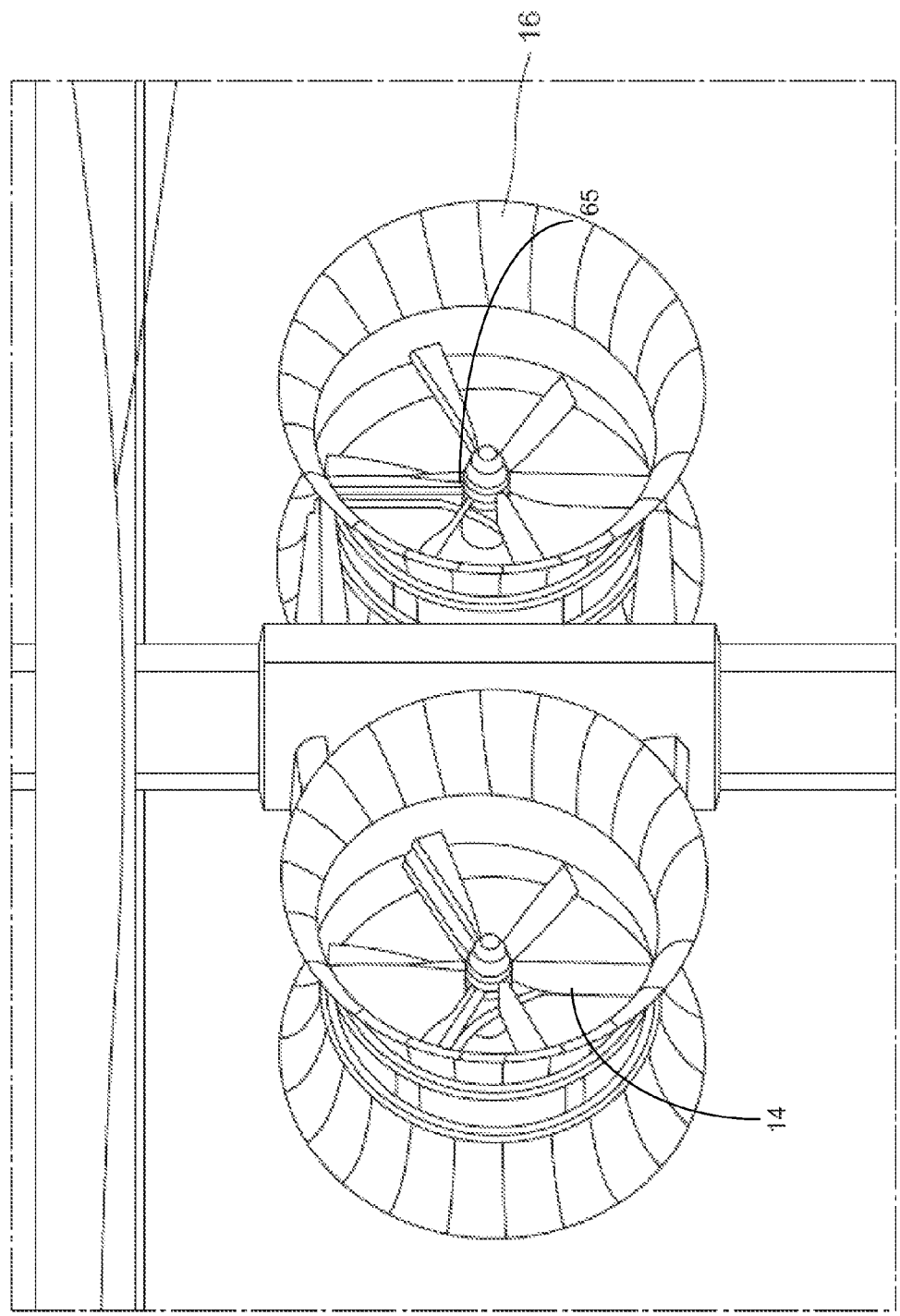
FIG. 12 shows a perspective view of a pair of mounted central axis turbines according to a preferred embodiment of the present invention.

FIG. 12 shows two turbines 10 deployed on a pylon 67. The turbines 10 may also be deployed by other means such as but not limited to; gravity based structures or floating structures. The structures may or may not afford axial rotation around the vertical axis. The turbine housing 16 shown in the Figures is constructed of modular components 17 that will generally be manufactured from moulded fibre reinforced plastics in sections that are then joined together with structural fasteners. The turbine housing can alternatively be fabricated using structural ribs and sheet skin from steel, non-ferrous alloys or fibre reinforced plastics. The housing allows focussing of water into the turbine from currents that are not perpendicular to the plane of rotation of the blades.

For commercial purposes, the turbine 10 can be any size. As an example, it is expected that a turbine of five meter diameter at the blades and approximately seven meters at the housing mouth, is capable of producing up to approximately 1 MW depending on water speed. The generator unit may produce electrical power as either alternating current (AC) or direct current (DC), and may be controlled electronically, which may allow control of electrical power output characteristics.

Power generated by the generator means may be stored by or separately from the generator means, for example, by one or more batteries, or may be fed directly into a power system, for example, a local power system. In the latter case, synchronisation, power factor and voltage of the power generated may be regulated electronically, using a variable speed drive (VSD) for example, prior to being fed into a local power distribution mains system such as a power grid. The generator means may be coupled by a cable, for example, a submarine cable, to the local power distribution system.

As mentioned, the cowling, housing or duct 16 in preferred embodiments has a liquid or fluid flow channel therethrough and the rotor 14 is mounted in the flow channel for rotation in response to liquid/fluid (water) flow through the flow channel. The flow channel defines a flow restriction which can form a venturi comprising a convergent-divergent venturi, tapering from openings at either end of the flow channel towards an inner part of the flow channel. The housing is substantially symmetrical about a mid-point location and the rotor is located substantially at the mid-point location within the flow channel.

Figure 8:
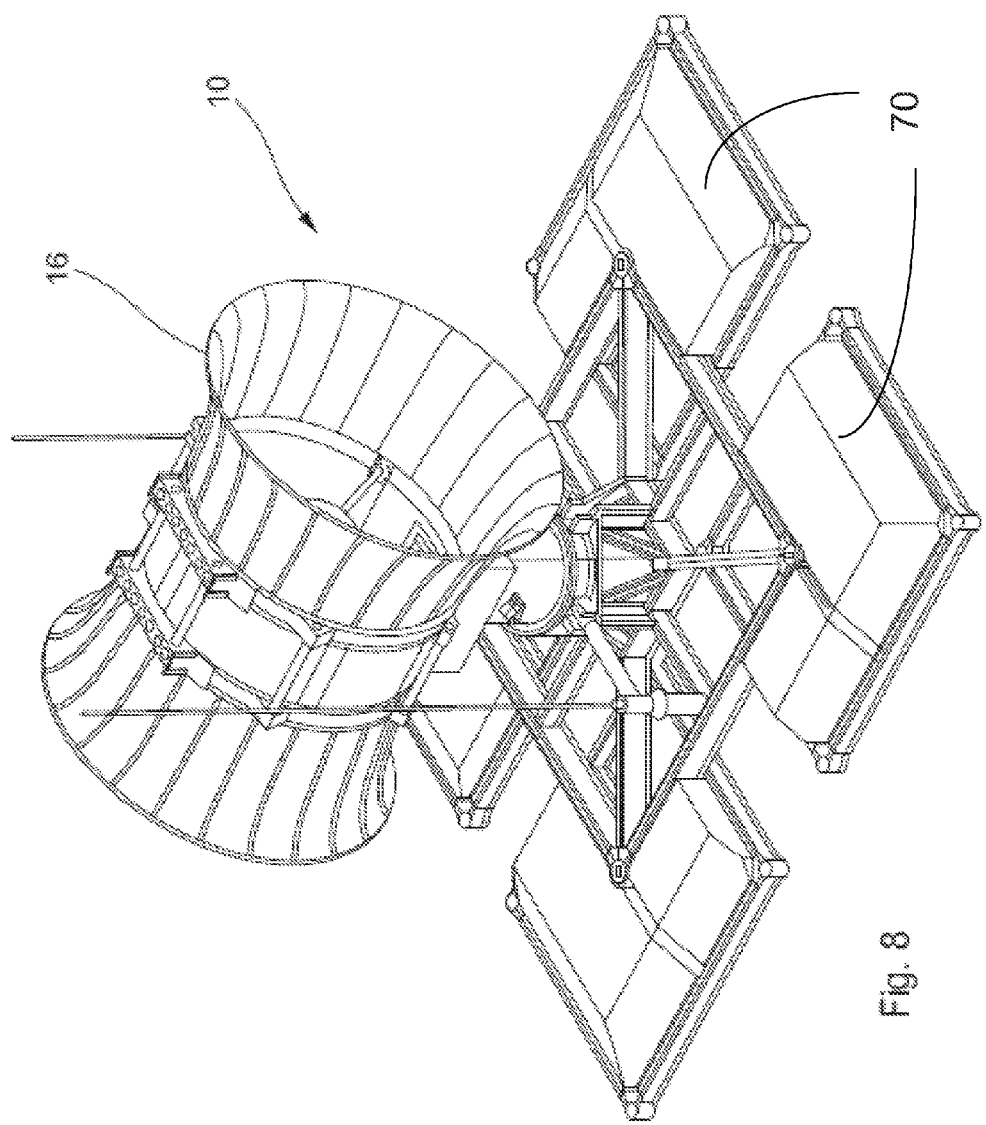
FIG. 8 is an isometric view of the central axis water turbine according to an embodiment of the present invention shown in an installed position on ballasted feet.

The housing or duct or cowling 16 comprises a single sleeve. In such implementation the housing or duct has a narrowed or reduced waist on an outer surface thereof between ends thereof, and in this case, substantially mid-way between the ends thereof. However, in a modified implementation the turbine housing can comprise an outer housing sleeve and an inner housing sleeve which inner sleeve defines the flow channel. In use the housing can be secured to an underwater surface by a support or mounting structure such as one or more ballast feet 70, as shown in FIG. 8, and substantially aligned to a direction of predicted tidal or current flow. The angle between the actual direction of the housing and the direction of tidal or current flow can be between about 0° to about 45° or more. The housing, as shown in the Figures, comprises sections, each of which includes flanges at their perimeters so that bolts or other fasteners such as for example adhesive tapes or glues can be used to hold them against their adjacent component.

Testing has shown that, as shown in the Figures, power output from the turbine unit increases when the inlet radius is larger than the throat radius. Testing and modelling has indicated that power is increased to an optimum level when balanced against drag, when the inlet radius is approximately 10% larger, however other ratios may be used such as 20% or 30% which is expected to increase power output.

An inlet and/or outlet diameter of the flow channel can be in the range 1 meter to 25+ meters, depending on the amount of power generation required. Typically, the turbine will have a diameter of around 2 to 10 meters. The length of the flow channel or duct can be in the range 1 meter to 15+ meters, depending on the size of the turbine.

The turbine housing 16 is preferably secured to an underwater surface, for example, a floor or bed of a sea, ocean or river by, for example, a mounting structure, which may be substantially aligned with the direction of tidal flow. Alternatively, the turbine housing 16 may be moveably secured to an underwater surface to allow movement to face the direction of main or tidal flow. The turbine unit may comprise a sub-sea turbine, but it will be appreciated that the turbine unit may be used in any underwater environment where a liquid flow exists, for example, in any tidal or river flow situation.

An electrical cabinet 69 is provided in the preferred embodiment shown in the Figures, the cabinet being affixed to the downstream end of the generator 18. The generator chamber is sealed from the electrical cabinet with positive air or hydraulic fluid pressure.

Figure 13:
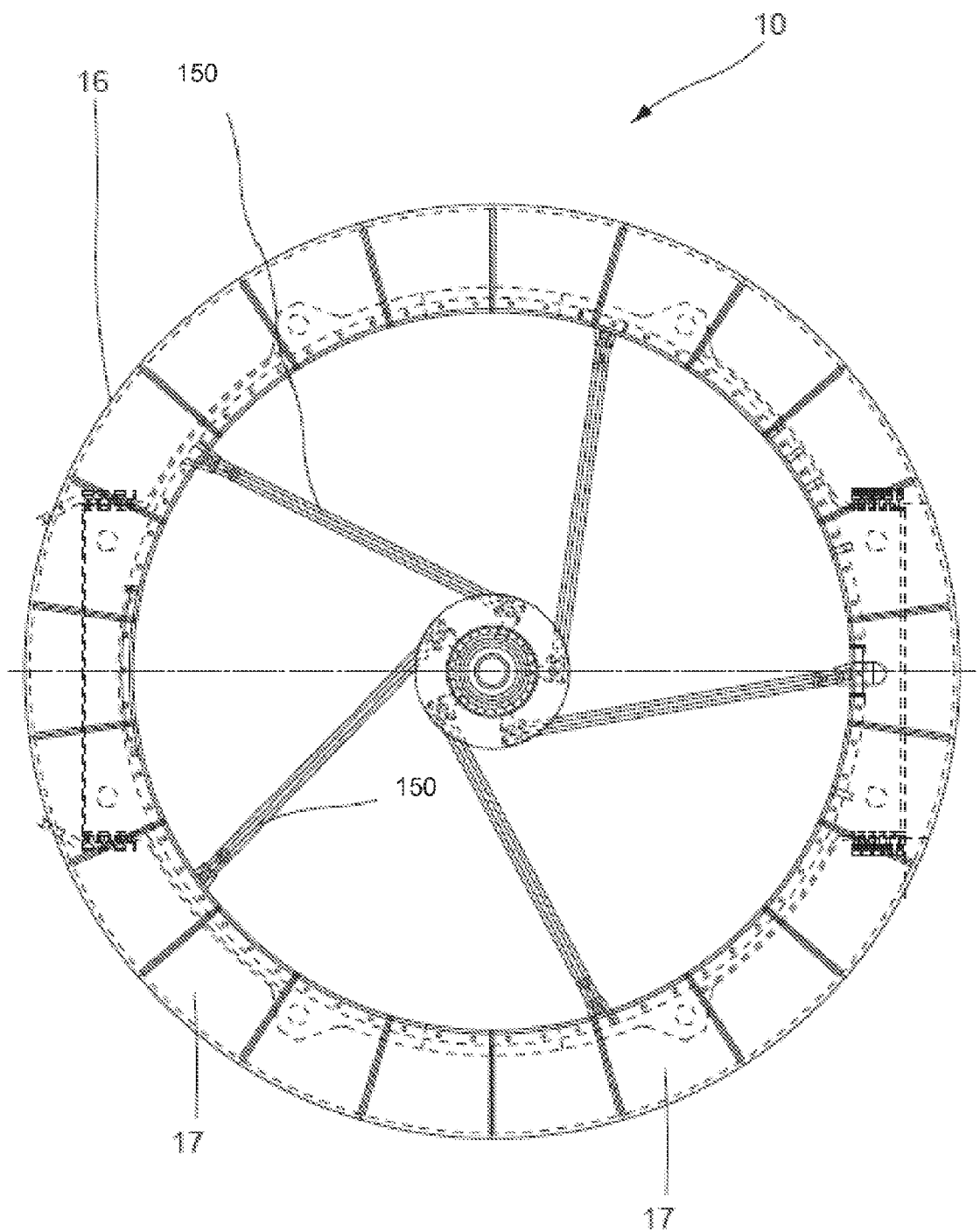
FIG. 13 is a front elevation view of a housing showing tangentially-mounted support struts.

Referring to FIG. 13, the support struts 150 are tangentially-mounted to improve torque transfer between generator and housing. This preferred arrangement is advantageous because it can facilitate reduction of the size of the struts, and reduces shadowing of the support struts. That is, it can be seen that radially-extending support struts 50 (FIG. 5) can be completely shadowed behind a radially-extending blade, each time they pass a strut 50. However, this shadowing is more gradual with a tangentially-extending blade, which also assists with improving exit flow from the trailing edge of the blade.

Figure 14:
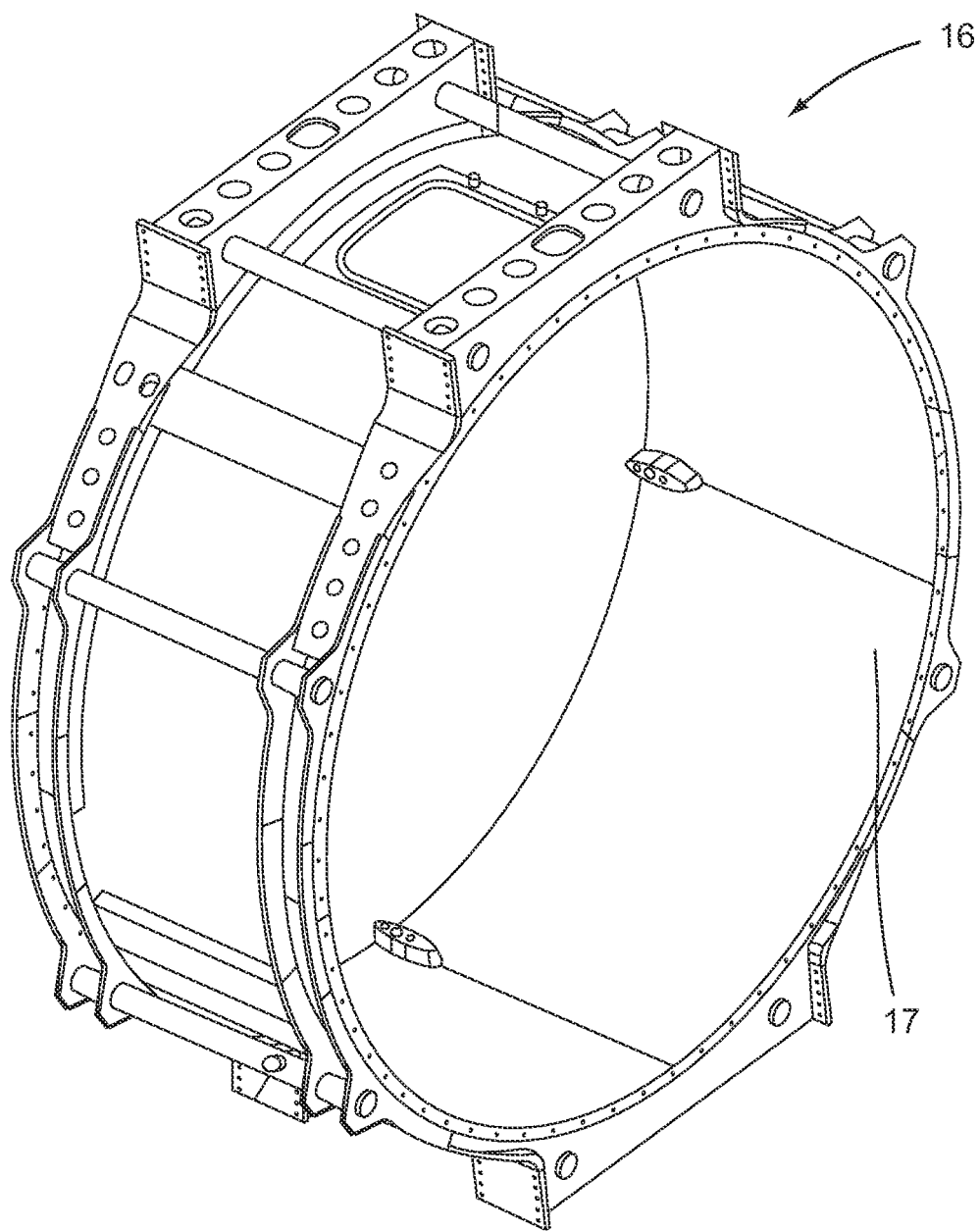
FIG. 14 is an isometric view of a housing showing mounts for support struts.

In some preferred embodiments, the electric generator assembly 18, cabinet 6a, broke and hub and rotor can be assembled as a single module. The module (not shown) includes the rotor, shaft, generator, brake, hub and other associated elements suitable for mounting in the centrally-disposed module. The module is streamlined and may be shipped separately such as for example in a kit of parts. The housing may be shipped as shown in FIG. 14, wherein the mounts for the support struts are welded to the inner wall of the housing. The support struts are then bolted to the wall mounts and then bolted to the tangential module mounts so the module is held in place in its central position by the support struts and bolted in place. Thus, a kit of parts may be supplied to a site, whereupon the kit is assembled by simple bolted connections on, say, a barge, and then is installed at sea or other water flow site such as a river.

The marine environment is extremely aggressive to materials from which the turbine assembly is constructed. Therefore several measures are taken in the preferred embodiment shown to mitigate damage to the turbine assembly. For example, the housing 16 and main body 12, and various other parts are painted or otherwise coated with antifouling material to minimise growth of marine life including barnacles and other sea creatures. Furthermore, sacrificial anodes (not shown) are attached to metal components or otherwise electrically connected thereto.

Preferably the power generator generates electrical power.

The turbine may also be adapted to run a pump which in turn causes a generator to rotate to generate electricity through fluid being pumped by the turbine.

The turbine includes a housing having a flow channel there through, the at least one turbine means being mounted in the flow channel for rotation in response to liquid flow through the flow channel. The generator means may be located separately from the turbine housing or integrated in the rotor.

Preferably the liquid is provided from a body of water within which the turbine unit is submerged, and may be sea water or river.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for generating electricity from a natural water current in a body of water, the apparatus comprising:
    a turbine body having a central axis, the turbine body configured to be disposed in the body of water;
    a rotor mounted on the turbine body for rotation about the central axis, the rotor including a central hub supporting a plurality of blades, each blade of the plurality of blades extending from a blade root mounted on the hub to a blade tip, the rotor configured to be rotated by the natural water current within the body of water, the natural water current flowing parallel to a surface of the body of water;
    a generator driven by the rotor, the generator configured to generate electricity; and
    a cowling, an internal wall of the cowling surrounding the rotor, the cowling configured to direct the natural water current towards the plurality of blades, the cowling defining a flow channel having a flow restriction, the flow restriction forming a convergent-divergent venturi, tapering from a first opening at a first end of the flow channel and a second opening at a second end of the flow channel towards an inner part of the flow channel;
    a plurality of support struts configured to support the generator in a central position within the flow channel, each support strut from the plurality of support struts extending tangentially outward from the generator to the internal wall of the cowling, the plurality of support struts being located directly downstream of the plurality of blades, the generator being located directly downstream of the plurality of support struts, each support strut from the plurality of support struts defining a hollow duct within which at least one of an electrical line or a hydraulic line can be disposed; and
    a ballasted foot configured to be located on a floor of the body of water, the ballasted foot including a plurality of equally-spaced platform members and a vertical pylori, the vertical pylori disposed between the cowling and the ballasted foot and configured to support the cowling in the natural water current,
    wherein each blade root of the plurality of blades includes a plug coupled thereto and configured to reduce interference to water flow, each blade tip of the plurality of blades is disposed adjacent to, but not contacting, the internal wall of the inner part of the flow channel, and each blade of the plurality of blades is raked in a downstream direction from the blade root to the blade tip by a downstream rake angle of 1° to 20° from a vertical plane, the vertical plane perpendicular to the central axis.

2. The apparatus according to claim 1, wherein the cowling extends upstream of the plurality of blades a selected distance to facilitate direction of water flow towards the plurality of blades.

3. The apparatus according to claim 1, wherein the rake angle is from 4° to 6°.

4. The apparatus according to claim 3, wherein the rake angle is about 5°.

5. The apparatus according to claim 1, wherein the plurality of blades includes at least 3 blades.

6. The apparatus according to claim 1, further comprising a nose cone mounted on the rotor.

7. The apparatus according to claim 1, further comprising a variable speed drive.

8. The apparatus according to claim 1, wherein the cowling includes a plurality of cowling portions, the plurality of cowling portions fastened together when the cowling is assembled.

9. A method of generating electricity from natural marine water currents, the method comprising:
    providing an apparatus according to claim 1 in a marine environment;
    the rotor configured to be rotated by the natural water current, the rotation of the rotor driving the generator to generate electrical power; and
    drawing electrical power from the generator.

10. The apparatus of claim 1, wherein a hydrostatic pressure at an entrance of the cowling is approximately equal to a hydrostatic pressure at an exit of the cowling.

11. The apparatus of claim 1, wherein the cowling is constructed from a reinforced plastic.

12. The apparatus of claim 1 wherein the natural water current is at least one of a tidal current or a marine sub-sea water current.

13. The apparatus of claim 1 wherein the cowling is configured to maintain a direction of the natural water current parallel with the surface of the body of water.

* * * * *